United States Patent [19]

Hoeting et al.

[11] Patent Number: 6,093,428
[45] Date of Patent: *Jul. 25, 2000

[54] CONFECTIONARY HOLDER

[75] Inventors: Michael G. Hoeting; Sean T. Mullaney, both of Cincinnati, Ohio

[73] Assignee: Oddzon, Inc., Pawtucket, R.I.

[*] Notice: This patent is subject to a terminal disclaimer.

[21] Appl. No.: 09/306,357

[22] Filed: May 6, 1999

Related U.S. Application Data

[63] Continuation of application No. 08/684,313, Jul. 17, 1996, Pat. No. 5,955,125.

[51] Int. Cl.[7] ............................ A23G 1/00; B65D 81/36
[52] U.S. Cl. ......................... 426/104; 426/132; 84/402; 446/408; 446/419; 221/24; 221/306
[58] Field of Search .................... 426/104, 132, 426/660; 84/404, 402, 465; 446/409, 419, 408; D21/65; 221/24, 303, 306

[56] References Cited

U.S. PATENT DOCUMENTS

| D. 263,622 | 3/1982 | Hasson | D24/34 |
|---|---|---|---|
| D. 297,580 | 9/1988 | Hoashi | D1/130 |
| D. 359,232 | 6/1995 | Diamond et al. | D9/307 |
| D. 380,239 | 6/1997 | Zur | D21/59 |
| D. 388,322 | 12/1997 | Hoeting et al. | D9/415 |
| 2,102,807 | 12/1937 | Perks | 273/138 |
| 2,417,641 | 3/1947 | Fischer | 161/23 |
| 2,532,116 | 11/1950 | Monaco | 46/175 |
| 2,961,796 | 11/1960 | Davis | 46/236 |
| 3,138,249 | 6/1964 | Paulini | 206/47 |
| 3,278,011 | 10/1966 | Viemeister | 206/45.14 |
| 3,800,443 | 4/1974 | O'Connell et al. | 35/35 H |
| 4,034,499 | 7/1977 | Wild | 46/52 |
| 4,192,307 | 3/1980 | Baer | 128/252 |
| 4,294,168 | 10/1981 | Redhead | 99/494 |
| 4,343,475 | 8/1982 | Stader | 273/276 |
| 4,560,086 | 12/1985 | Stol | 221/24 |
| 4,720,283 | 1/1988 | Williams et al. | 446/69 |
| 4,844,447 | 7/1989 | McKnight | 272/27 N |
| 4,863,169 | 9/1989 | Miyazaki | 273/109 |
| 4,902,263 | 2/1990 | Ito et al. | 453/49 |
| 4,948,012 | 8/1990 | Snediker, Sr. et al. | 221/195 |
| 5,176,288 | 1/1993 | Craven | 221/124 |
| 5,212,331 | 5/1993 | Waldo | 84/404 |
| 5,307,941 | 5/1994 | Slegal | 211/11 |
| 5,385,267 | 1/1995 | Diamond et al. | 221/248 |
| 5,505,114 | 4/1996 | Lawson | 84/404 |
| 5,540,353 | 7/1996 | Coleman et al. | 221/24 |
| 5,542,570 | 8/1996 | Nottingham et al. | 221/192 |
| 5,659,143 | 8/1997 | Isackson | 84/402 |
| 5,782,378 | 7/1998 | Hart et al. | 221/24 |
| 5,955,125 | 9/1999 | Hoeting et al. | 426/104 |

*Primary Examiner*—Milton Cano
*Assistant Examiner*—Sherry A. Dauerman
*Attorney, Agent, or Firm*—Marshall, O'Toole, Gerstein, Murray & Borun

[57] ABSTRACT

The present invention relates to a confectionary holder which simulates the sound of rain as the holder is vertically positioned. The holder comprises a transparent tube having ends, two sides, and at least two sets of indents directed inward toward the center of the tube and one set of indents per side of the tube. Each indent has a peak, a peak depth, a sloping upper face, a sloping lower face, and between each indent is a space length. The peaks of the indents alternate from one side to the other side along the tube length. The angle of incline of each indent face and the length of the space between each indent are selected to allow rigid items, e.g., candy or gum, when placed in the holder, to create the sound of rain as the confectionary pieces flow downward dropping onto each indent face, sliding off each face, and moving from side to side from one end of the holder to the other end when the holder is vertically positioned. The holder is emptied through a small opening at one end and filled through an opening at the other end. The tube is manufactured by blow molding. A cap with an small opening and a plug are provided. The holder has a dispensing position and a storage position. The holder is blow molded from a rigid plastic that vibrates at a high frequency. The caps are manufactured by injecting molding.

20 Claims, 6 Drawing Sheets

CONFECTIONARY HOLDER

This is a Continuation of U.S. application Ser. No. 08/684,313, filed Jul. 17, 1996 now U.S. Pat. No. 5,955,125.

TECHNICAL FIELD

The present invention relates generally to a toy device, and more particularly to a toy confectionary holder having at least two alternating sets of indents directed toward the center of the holder and spaces between the indents that simulates the sound of rain as confectionary pieces drop onto each indent face and slide off each face moving from side to side from one end of the holder to the other end when the holder is vertically positioned.

BACKGROUND OF THE INVENTION

It is well known that certain sounds are more pleasant to listen to than other sounds. The sound of ocean waves and the sound of rain are desirable to listen to as they are soothing sounds. The rain stick provides the sound of rain to listeners. The rain stick is a dried cactus in which the needles have been pushed inward so that the needles criss-cross in the center of the cactus. The cactus is partially filled with lava pebbles through a drilled opening in the top of the cactus which is then closed. When the rain stick is vertically positioned, the pebbles simulate the sound of rain as they bounce off the needles moving to the lower end of the stick.

Normally when confectionary pieces are placed in a holder, the confectionary pieces rattle as they move within the holder. Babies enjoy holding and shaking a rattle although the rattle does not contain confectionary pieces. U.S. Pat. No. 4,844,447 relates to a toy that provides a pleasing sound when bead-like objects fall through a generally cylindrical tubular body striking inwardly extending spokes. In the earthquake game, both noise and vibrations are created as a ball moves through a downwardly projecting tunnel having ridges in the bottom, U.S. Pat. No. 4,343,475. Using the objects usually found within these toys do not provide desirable and soothing sounds.

SUMMARY OF SAID INVENTION

Accordingly, said present invention provides a holder, said holder containing confectionary pieces which simulate said sound of rain when said holder is vertically positioned and said confectionary pieces move from one end of said holder to said other end. Said holder comprises a tube having two ends and two sides. The tube having at least two sets of indents directed toward said center of said tube and spaces between each indent. A set of indents is provided on each side of said tube. Each indent has a peak, a peak depth, an upper sloping face, a lower sloping face, and, between each indent, a space length. Said peaks of said first set of indents are spaced at alternate intervals from said peaks of said second set of indents. Said angle of incline of each face and said length of each space between said indents are selected to allow rigid items when placed in the tube to flow downward, dropping onto each indent face moving from side to side from one end of said holder to said other end thereby simulating the sound of rain when said holder is vertically positioned.

BEST MODE FOR CARRYING OUT THE INVENTION

Figure 1:
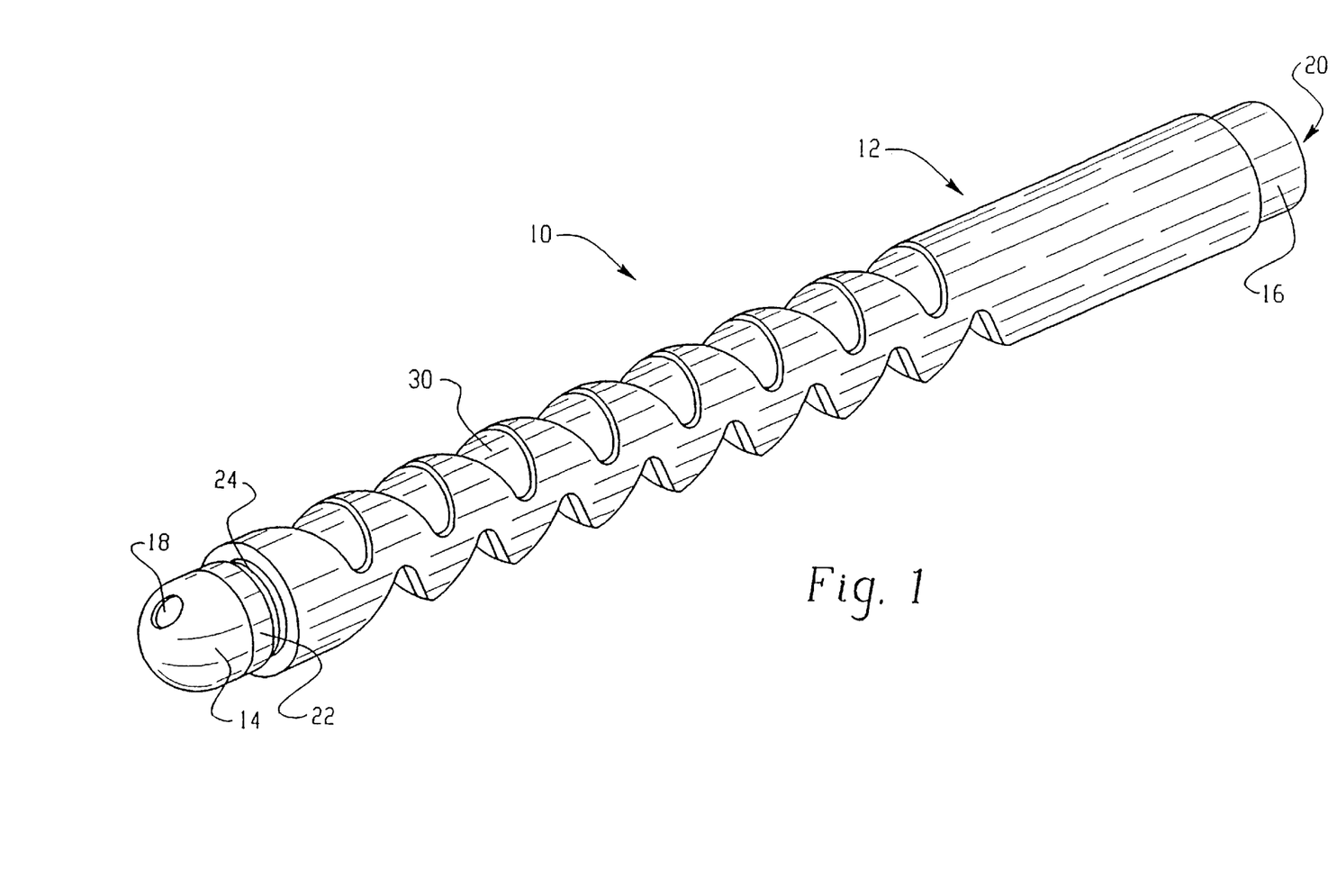
FIG. 1 is a perspective view of a preferred embodiment of a confectionary holder according to the present invention.
Figure 2:
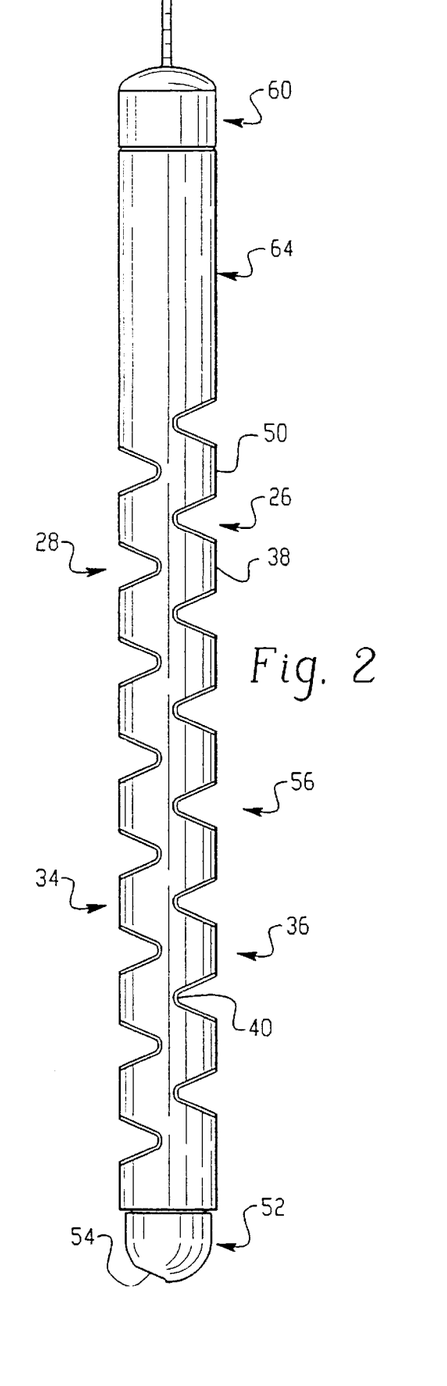
FIG. 2 is a side view of said holder shown with a top cap and a bottom cap.
Figure 3:
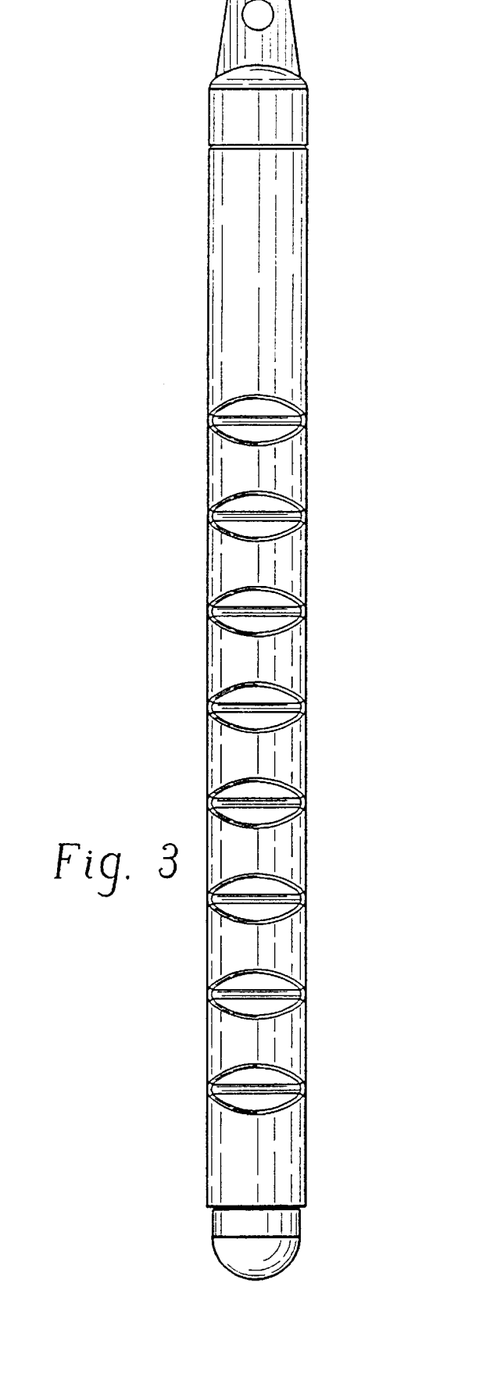
FIG. 3 is a front view of said holder shown with said caps.
Figure 4:
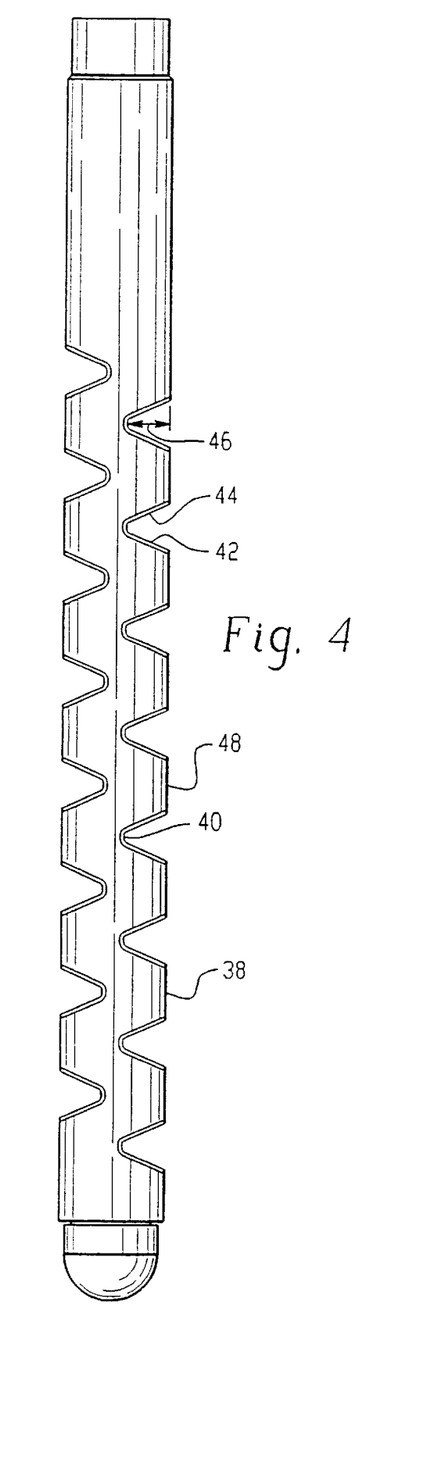
FIG. 4 is a side view of said holder shown without said caps.
Figure 5:
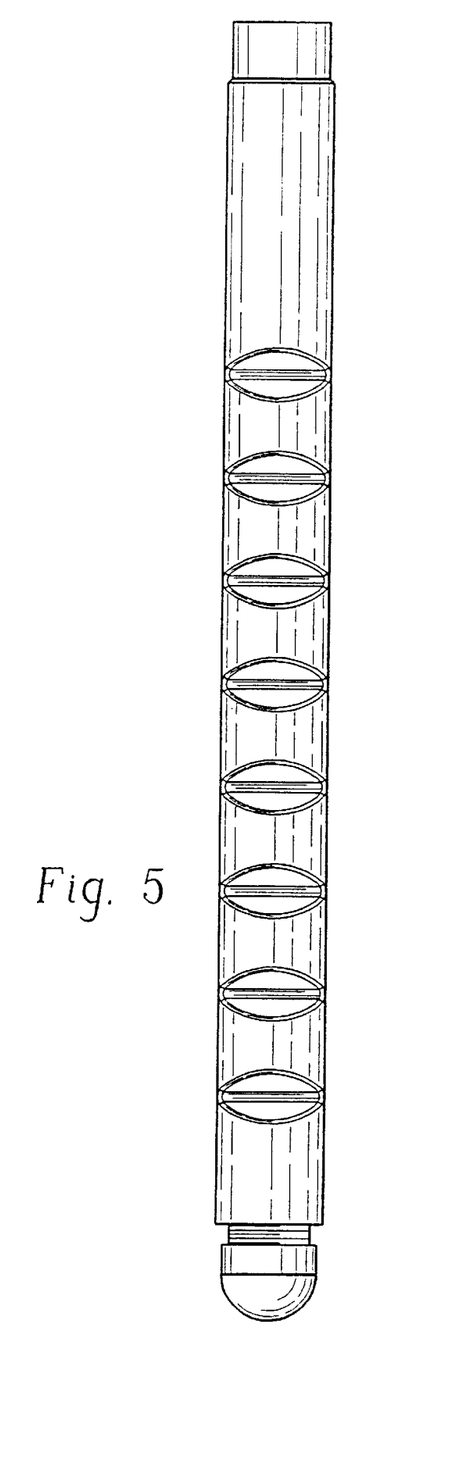
FIG. 5 is a front view of said holder.
Figure 6:
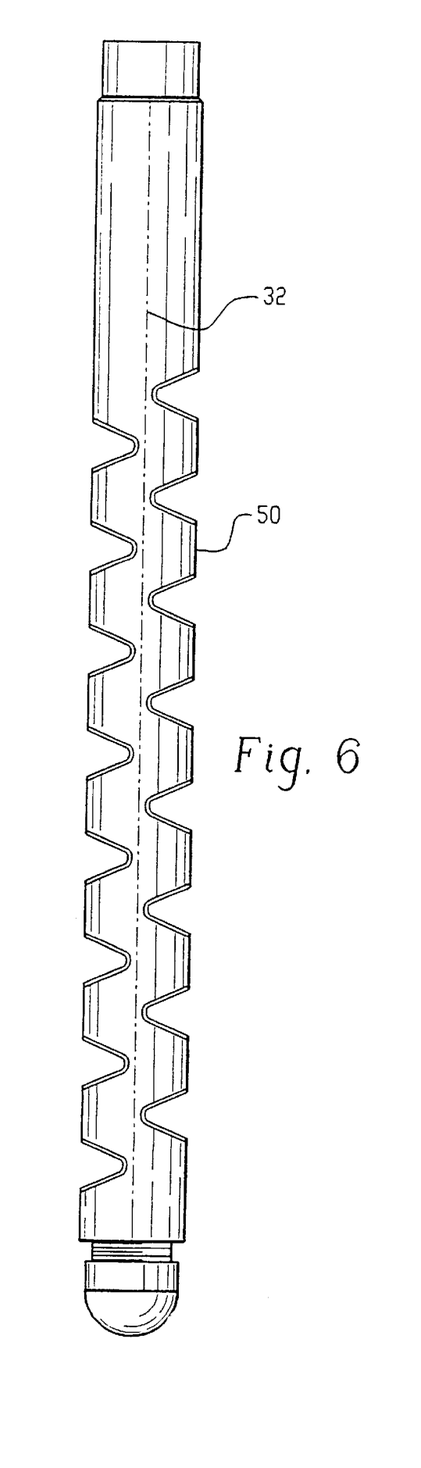
FIG. 6 is a side view of said holder.
Figure 7:
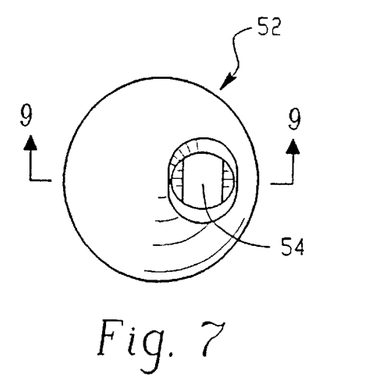
FIG. 7 is a top view of said top cap.
Figure 8:
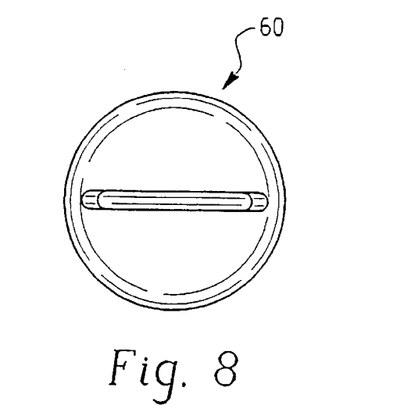
FIG. 8 is a top view of said bottom cap.
Figure 9:
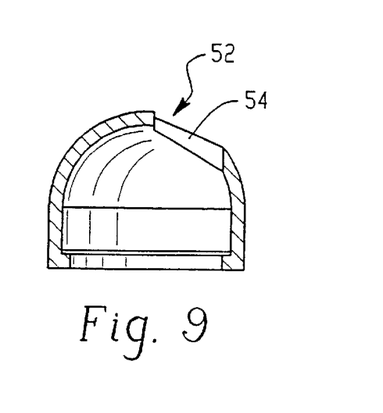
FIG. 9 is a sectional view of said top cap, taken along line 9—9 of FIG. 7.
Figure 10:
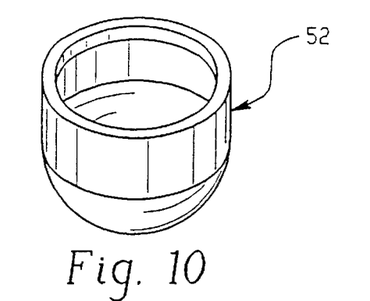
FIG. 10 is a perspective view of said top cap shown in an inverted position.

Referring now specifically to the drawings and in particular to FIGS. 1–13, there is illustrated therein a holder device in accordance with the present invention being generally designated at 10. As seen with reference to FIG. 1, holder 10 is a tube 12 having a top end 14 and a bottom end 16. Top end 14 has a small opening at 18 for small pieces of confectionary, i.e., candy or gum, to gradually drop out of said holder. Bottom end 16 is completely open at 20 in order to fill or partially fill said holder with confectionary pieces. Top end 14 and bottom end 16 have a slightly reduced diameter. Above top end 14 of said tube 12 is a neck 22, which is reduced in diameter compared to said to end Neck 22 can be threaded 24.

Tube 12 has at least two sets 26 and 28 of indents 30. Each indent 30 is directed toward the center 32 of said tube. One set 26 of indents is on one side 36 of said tube and said other set 28 of indents is along said other side 34 of said tube. Between each indent 30 is space 38. Each indent 30 has a peak 40, an upper face 42, a lower face 44, and a peak depth 46. Moving from said top end 14 to said bottom end 16 of said tube, said indents alternate from one side 34 to said other side 36. Each peak 40 is directed inward and toward space 38 positioned on said other side of said tube. When said peak depth 46 is less than the radius of said tube, said peak 40 is directed toward a midpoint 48 of said space length 50. The length of the space is dictated by the size of the confectionary used within. When said peak depth 46 is greater than the radius of said tube 12, said peak 40 is directed toward said space but not necessarily toward said mid-point 48. Upper face 42 and lower face 44 are sloped and can have substantially the same degree of incline or slope, i.e., preferably less than forty-five degrees.

Holder 10 can be made of glass, plastic, e.g., clear PVC, polycarbonate or clear ABS, or any other suitable material. When holder 10 is manufactured, it is desirable to blow mold a rigid plastic that vibrates at a high frequency. Holder 10 is transparent e.g., between three and eleven and a half inches long, between one-eighth and one inch in diameter and having at least two indents on each side. The ratio of the length to the diameter is at a minimum approximately 10:1.

A cap 52 having an opening 54 is provided for said top end 14. Cap 52 can snap onto said end 14 or can screw onto said threaded neck 24. Cap 52 is rotatable on said top end. The holder 10 has a storage position 56 and a dispensing position 58. When said opening 54 in said cap 52 and said opening 18 in said top end 14 are aligned, the holder 10 is in the dispensing position 58. When said opening 54 and said opening 18 are not aligned, said holder is in said storage position 56. A bottom plug 60 fits over said bottom opening 20. Plug 60 is removable for filling and refilling said holder 10 with confectionary pieces 62. The cap 52 and the plug 60 can be injection molded from low density PE.

Figure 11:
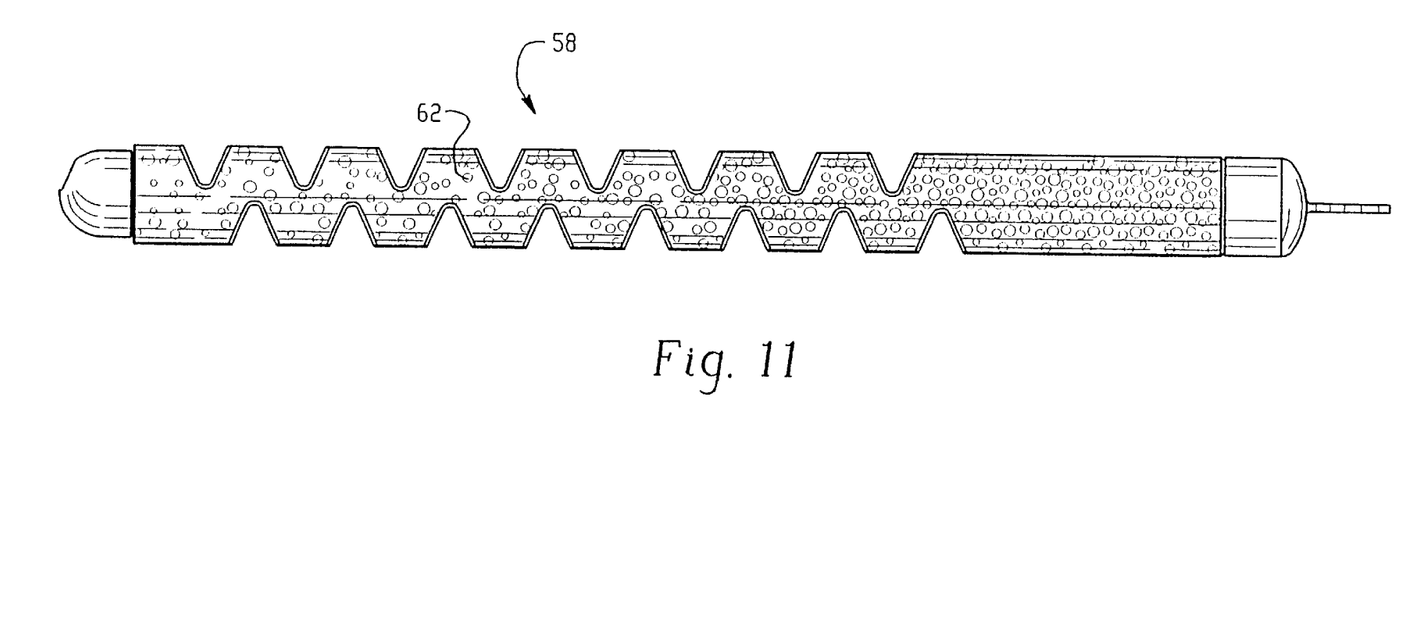
FIG. 11 is a side elevational view of said holder partially filled with confectionary pieces.
Figure 12:
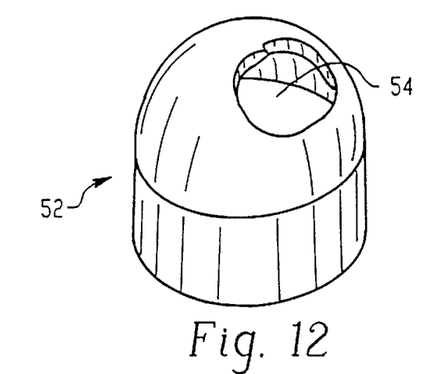
FIG. 12 is a perspective view of said top cap.
Figure 13:
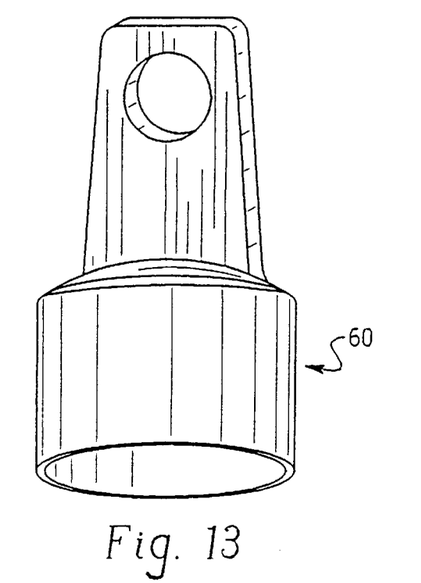
FIG. 13 is a perspective view of said bottom cap.

Holder 10 is partially filled with confectionary pieces 62. Confectionary pieces are of a standard type being rigid and multi-colored. Each piece is small enough to fit easily through openings 18 and 54. Holder 10 is transparent in order to view the multi-colored confectionary pieces. A label can be positioned around the tube at 64.

When said holder is vertically positioned, the confectionary pieces 62 simulate the sound of rain as the confectionary pieces drop onto either of said upper face or said lower face of each indent and slides off of each face moving from side to side from one end of said holder to said other end of said holder. The confectionary pieces should flow freely through the holder, i.e., jamming of the confectionary is to be avoided.

EXAMPLE 1

A holder was made using polycarbonate and vacuum, forming each side of the tube, and glueing the halves together. The holder was ten and one-half inches long and one inch wide and had two sets of eight indents along each side. The indent peaks were directed toward the center of said tube, and said peak depth was less than the radius of said tube. The upper and lower faces had the same slopes, which were less than a forty-five degree angle. The confectionary pieces were multicolored rigid pieces of gum approximately an eighth of an inch in length. The bottom opening was less than one inch in diameter, and the top opening was between one-eighth and three-fourth of an inch in diameter. The confectionary pieces partially filled said holder. When the holder was positioned vertically, the confectionary pieces quickly dropped by gravity hitting each indent face moving from side to side down the holder and sounded like rain.

Accordingly, the preferred embodiment of a device and method of manufacturing the device have been described. With the foregoing description in mind, however, it is understood that this description is made only by way of example, that the invention is not limited to the particular embodiments described herein, and that various rearrangements, modifications and substitutions may be implemented without departing from the true spirit of the invention as hereinafter claimed.

What is claimed is:

1. A confectionary holder, comprising:
   an elongate tube composed of a clear material, said elongate tube having a first set of indents formed by said clear material on a first side of said elongate tube and a second set of indents formed by said clear material on a second side of said elongate tube opposite said first side of said elongate tube, said indents of said first set being offset from said indents of said second set in a direction parallel to a central longitudinal axis of said elongate tube, said elongate tube having an aperture formed therein;
   a plurality of pieces of confectionary disposed within said elongate tube, said pieces of confectionary being sized to allow said pieces of confectionary to pass through said aperture formed in said elongate tube; and
   an end piece rotatably coupled to said elongate tube, said end piece being rotatable between a first position in which said end piece blocks said aperture formed in said elongate tube to prevent said confectionary pieces from passing from an interior portion of said elongate tube through said aperture and a second position in which said end piece allows one of said confectionary pieces to pass from an interior portion of said elongate tube, through said aperture formed in said elongate tube, to a point outside of said elongate tube.

2. A confectionary holder as defined in claim 1 wherein said end piece comprises an end cap having a hole formed therein and wherein said hole in said end cap is rotatably aligned with said aperture formed in said elongate tube when said end cap is in said second position.

3. A confectionary holder as defined in claim 1 wherein each of said indents comprises a first surface and a second surface, said first and second surfaces being disposed at a non-zero acute angle relative to a plane perpendicular to said central longitudinal axis of said elongate tube.

4. A confectionary holder as defined in claim 1 wherein each of said indents comprises a first surface and a second surface, said first and second surfaces being disposed at non-zero acute angles less than forty-five degrees relative to a plane perpendicular to said central longitudinal axis of said elongate tube.

5. A confectionary holder as defined in claim 4 wherein said first surfaces of said indents are disposed at a first angle relative to said plane and wherein said second surfaces of said indents are disposed at a second angle relative to said plane, and wherein said first and second angles are substantially the same.

6. A confectionary holder as defined in claim 1 wherein said elongate tube has an interior portion and a radius and wherein each of said indents extends into said interior portion of said elongate tube by a distance less than said radius of said elongate tube.

7. A confectionary holder as defined in claim 1 wherein each of said indents comprises a first flat surface and a second flat surface, said first and second flat surfaces being disposed at non-zero acute angles relative to a plane perpendicular to said central longitudinal axis of said elongate tube.

8. A confectionary holder as defined in claim 1 wherein said elongate tube has a first end portion and a second end portion, wherein each of said indents is shaped to allow said pieces of confectionary to pass from said first end portion to said second end portion without becoming entrapped by said indents when said elongate tube is positioned so that said central longitudinal axis of said elongate tube is disposed vertically, and wherein each of said indents is shaped to allow said pieces of confectionary to pass from said second end portion to said first end portion without becoming entrapped by said indents when said elongate tube is positioned so that said central longitudinal axis of said elongate tube is disposed vertically.

9. A confectionary holder as defined in claim 1 wherein said elongate tube has a second aperture formed therein and wherein said confectionary holder additionally comprises a second end piece which is disposed to cover said second aperture.

10. A confectionary holder, comprising:
    an elongate tube having a plurality of indents formed therein, each of said indents comprising a first surface and a second surface disposed at an angle relative to said first surface, said elongate tube having an aperture formed therein;
    a plurality of pieces of confectionary disposed within said elongate tube, said pieces of confectionary being sized to allow said pieces of confectionary to pass through said aperture formed in said elongate tube; and an end piece coupled to said elongate tube, said end piece being movable between a first position in which said end piece blocks said aperture formed in said elongate tube to prevent said confectionary pieces from passing from an interior portion of said elongate tube through said aperture and a second position in which said end piece allows one of said confectionary pieces to pass from an interior portion of said elongate tube, through said aperture formed in said elongate tube, to a point outside of said elongate tube, wherein said elongate tube has a first end portion, a second end portion and a central longitudinal axis, wherein each of said indents is shaped to allow said pieces of confectionary to pass from said first end portion to said second end portion without becoming entrapped by said indents when said elongate tube is positioned so that said central longitudinal axis of said elongate tube is disposed vertically, and wherein each of said indents is shaped to allow said pieces of confectionary to pass from said second end portion to said first end portion without becoming entrapped by said indents when said elongate tube is positioned so that said central longitudinal axis of said elongate tube is disposed vertically.

11. A confectionary holder as defined in claim 10 wherein said elongate tube has an interior portion and a radius and wherein each of said indents extends into said interior portion of said elongate tube by a distance less than said radius of said elongate tube.

12. A confectionary holder as defined in claim 10 wherein said elongate tube has a first set of indents on a first side of said elongate tube and a second set of indents on a second side of said elongate tube opposite said first side of said elongate tube, said indents of said first set being offset from said indents of said second set in a direction parallel to said central longitudinal axis of said elongate tube.

13. A confectionary holder as defined in claim 10 wherein said end piece comprises an end cap having a hole formed therein and wherein said hole in said end cap is rotatably aligned with said aperture formed in said elongate tube when said end cap is in said second position.

14. A confectionary holder as defined in claim 10 wherein each of said indents comprises a first surface and a second surface, said first and second surfaces being disposed at a non-zero acute angle relative to a plane perpendicular to said central longitudinal axis of said elongate tube.

15. A confectionary holder as defined in claim 10 wherein each of said indents comprises a first surface and a second surface, said first and second surfaces being disposed at non-zero acute angles less than forty-five degrees relative to a plane perpendicular to said central longitudinal axis of said elongate tube.

16. A confectionary holder as defined in claim 15 wherein said first surfaces of said indents are disposed at a first angle relative to said plane and wherein said second surfaces of said indents are disposed at a second angle relative to said plane, and wherein said first and second angles are substantially the same.

17. A confectionary holder as defined in claim 10 wherein said elongate tube has an interior portion and a radius and wherein each of said indents extends into said interior portion of said elongate tube by a distance less than said radius of said elongate tube.

18. A confectionary holder as defined in claim 10 wherein each of said indents comprises a first flat surface and a second flat surface, said first and second flat surfaces being disposed at non-zero acute angles relative to a plane perpendicular to said central longitudinal axis of said elongate tube.

19. A confectionary holder as defined in claim 10 wherein said elongate tube has a second aperture formed therein and wherein said confectionary holder additionally comprises a second end piece which is disposed to cover said second aperture.

20. A confectionary holder, comprising:

an elongate tube composed of a clear plastic material, said elongate tube having an interior portion and a radius and comprising:

a first set of indents formed by said clear plastic material on a first side of said elongate tube, each of said indents of said first set comprising a first flat surface and a second flat surface disposed at an acute angle relative to said first flat surface;

a second set of indents formed by said clear plastic material on a second side of said elongate tube opposite said first side of said elongate tube, each of said indents of said second set comprising a first flat surface and a second flat surface disposed at an acute angle relative to said first flat surfaces of said indents of said second set, said indents of said first set being offset from said indents of said second set in a direction parallel to a central longitudinal axis of said elongate tube;

each of said indents of said first and second sets extending into said interior portion of said elongate tube by a distance less than said radius of said elongate tube;

a first aperture formed in a first end portion of said elongate tube; and a second aperture formed in a second end portion of said elongate tube;

a plurality of pieces of confectionary disposed within said elongate tube, said pieces of confectionary being sized to allow said pieces of confectionary to pass through said first aperture formed in said elongate tube;

a first end piece rotatably coupled to said elongate tube and having a hole formed therein, said first end piece being rotatable to a first position in which said hole formed in said first end piece is not rotatably aligned with said first aperture formed in said elongate tube so that said first end piece blocks said first aperture formed in said elongate tube to prevent said confectionary pieces from passing from said interior portion of said elongate tube through said first aperture; and said first end piece being rotatable to a second position in which said hole formed in said first end piece is rotatably aligned with said first aperture formed in said elongate tube so that said first end piece allows one of said confectionary pieces to be pass from said interior portion of said elongate tube, through said first aperture formed in said elongate tube, to a point outside of said elongate tube; and a second end piece fixed to said elongate tube to cover said second aperture formed in said elongate tube, wherein each of said indents is shaped to allow said pieces of confectionary to pass from said first end portion to said second end portion without becoming entrapped by said indents when said elongate tube is positioned so that said central longitudinal axis of said elongate tube is disposed vertically, and wherein each of said indents is shaped to allow said pieces of confectionary to pass from said second end portion to said first end portion without becoming entrapped by said indents when said elongate tube is positioned so that said central longitudinal axis of said elongate tube is disposed vertically.

* * * * *